United States Patent [19]

Karaus

[11] Patent Number: 4,666,334
[45] Date of Patent: May 19, 1987

[54] EROSION CONTROL SYSTEM FOR BLUFFS LOCATED ADJACENT A BODY OF WATER

[76] Inventor: Edward Karaus, 380 W. Fremont St., Douglas, Mich. 49406

[21] Appl. No.: 740,506

[22] Filed: Jun. 3, 1985

[51] Int. Cl.$^4$ .................... E02B 3/06; E02B 11/00
[52] U.S. Cl. ........................... 405/31; 264/33; 405/43; 405/51; 405/258; 405/284; 405/287
[58] Field of Search ............ 405/15, 21, 25, 30, 405/31, 34, 36, 43, 50, 51, 116, 258, 284, 286, 287; 249/10; 264/33

[56] References Cited

U.S. PATENT DOCUMENTS

| | | | |
|---|---|---|---|
| 810,630 | 1/1906 | Dwight | 405/31 |
| 837,962 | 12/1906 | Rice | 405/286 |
| 919,788 | 4/1909 | Smith | 405/31 |
| 1,175,962 | 3/1916 | Latham | 405/31 |
| 1,610,341 | 12/1926 | Wells | 405/21 |
| 1,620,514 | 3/1927 | Brynoldt | 405/116 |
| 1,900,205 | 3/1933 | Sherrill | 405/287 |
| 1,993,291 | 3/1935 | Vermont | 405/286 |
| 2,420,228 | 5/1947 | Condon | 405/286 |
| 3,415,061 | 12/1968 | Staempfli | 405/34 |
| 3,490,239 | 1/1970 | Vincent | 405/31 |
| 3,538,710 | 11/1970 | Tourmen | 405/31 |
| 3,953,979 | 5/1976 | Kurose | 405/286 |
| 4,000,622 | 1/1977 | Chiaves | 405/286 |
| 4,067,166 | 1/1978 | Sheahan | 52/593 |
| 4,152,382 | 5/1979 | Catenacci | 264/33 |
| 4,287,141 | 9/1981 | Russell | 264/33 |
| 4,362,432 | 12/1982 | Conover | 405/33 |
| 4,407,608 | 10/1983 | Hubbard | 405/31 |
| 4,521,131 | 6/1985 | Nandlal | 405/116 |

FOREIGN PATENT DOCUMENTS 619562  8/1978  U.S.S.R. ........................ 405/31

Primary Examiner—David H. Corbin
Attorney, Agent, or Firm—Price, Heneveld, Cooper, DeWitt & Litton

[57] ABSTRACT

An erosion control system is disclosed which includes a seawall for protecting dunes or bluffs located adjacent a body of water. The seaward side of the seawall is notched or concave to direct incoming waves upwardly and outwardly, away from the base of the seawall and the bluff. The landward side is also notched or concave. This side is backfilled with soil which acts on the back surfaces of the seawall to lock the seawall into place. The erosion control system also includes a drain field that is installed below the bluff, behind the seawall. The drain field is in communication with the body of water via pipes extending through the seawall. The drain removes water from the bluff, thus decreasing the hydrostatic pressures within the bluff. This stabilizes the bluff itself and the seawall by decreasing the forces associated with hydrostatic pressure.

27 Claims, 6 Drawing Figures

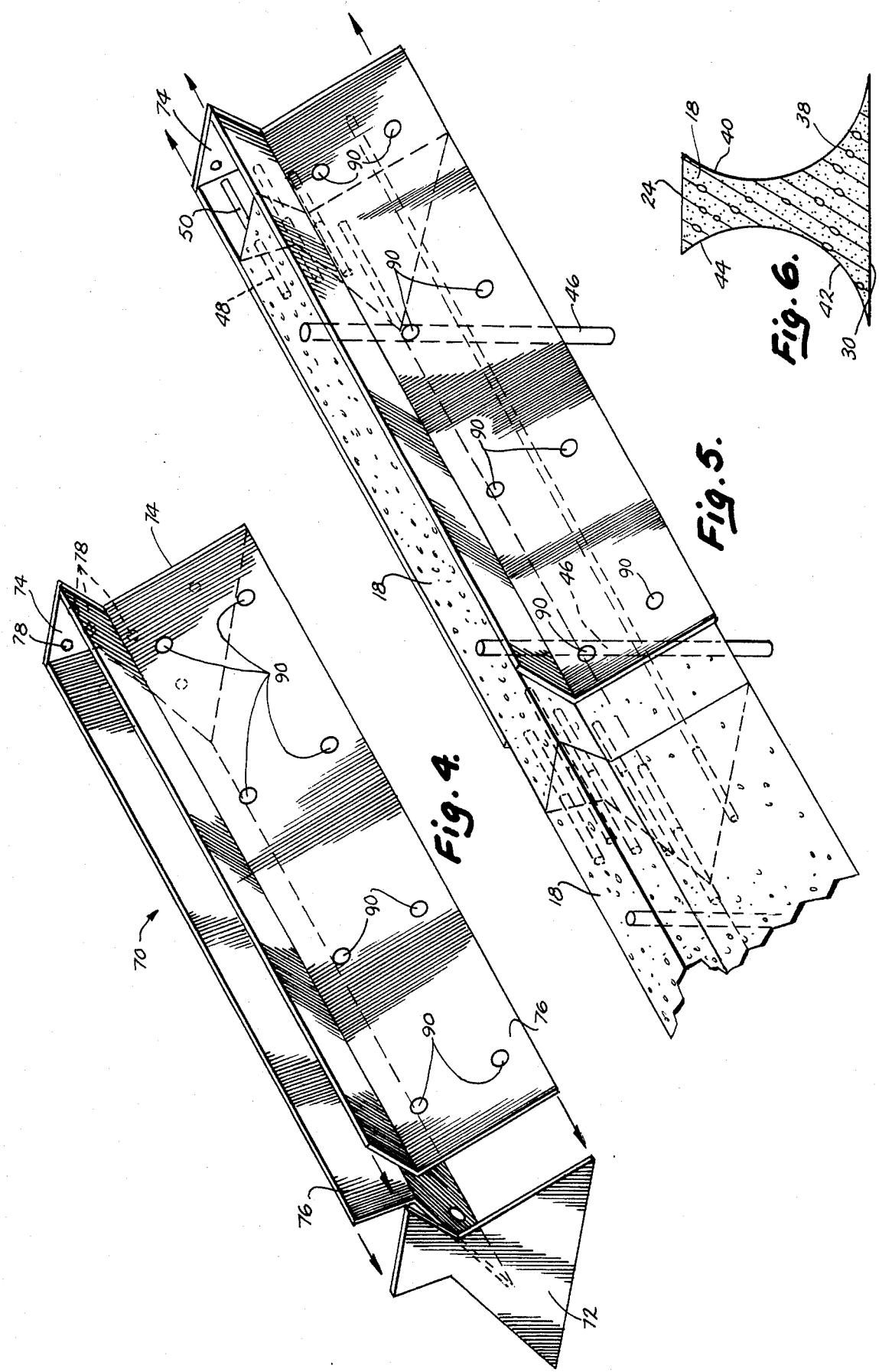

EROSION CONTROL SYSTEM FOR BLUFFS LOCATED ADJACENT A BODY OF WATER

BACKGROUND OF THE INVENTION

This invention relates to erosion control systems for preventing the erosion of bluffs, dunes and the like located adjacent a body of water, and more specifically to seawalls for preventing such erosion, and to a method for constructing the same.

The erosion of lake or oceanside bluffs represents a serious and longstanding problem. These bluffs are subject to the action of waves pounding against them which erodes away the bluff's base leaving a bluff having a very steep face. This steep front face is very unstable and, in many instances, is unable to support the weight of the dirt, sand, and the like, lying above it. Consequently, landslides may occur, the occurrence of which may endanger cottages or homes built on the top of the bluff.

These bluffs are also subject to the action of hydrostatic forces acting within them. Ground water and water from spray, rain or snow-melt percolates through the bluff, increasing the hydrostatic forces therein. These forces tend to exert an outward pressure against the unstable, steep face of the bluff. Landslides may occur if that outwardly exerted force causes the collapse of the steep face of the bluff.

The percolating water also causes stratification of the sand or soil within the bluff. The strata of soil can slide across each other, decreasing the stability of the bluff itself. This reduction in the stability of the bluff increases the likelihood that landslides will occur.

Structures have been interposed between bluffs and the adjacent body of water in order to prevent the erosion of the base of that bluff and to prevent the occurrence of landslides resulting therefrom. Flat faced seawalls or retaining walls are an example of such prior art structures. However, flat seawalls are relatively inefficient in dissipating the energy of a wave striking against them, and as a result, are plagued by erosion in front of the wall and undermining or tunneling under the wall. Further, it has been recognized that such flat seawalls reflect energy back into the water which accelerates beach erosion rather than promoting beach build-up.

Also, much of the energy of a wave striking a flat seawall is directed downwardly toward the base of the wall. The turbulence associated with this energy results in a trough or tunneling action along the seawall base which undermines the structure, thus causing it to collapse into the water. Moreover, another portion of the wave energy is dissipated by splashing over the top of the wall. This water collects on the bluff and percolates behind the wall, thus increasing the outwardly extending hydrostatic forces within the bluff and eroding the seawall base when it runs back toward the body of water. Such erosion and pressure promotes the failure of the seawall. The problem is exacerbated by rainwater, snow-melt and ground water. In cooler climates heaving of frozen ground behind the seawall and the weight and pressure of ice build-up add to the forces encountered by the wall.

Numerous seawalls have been devised to avoid the deficiencies of flat seawalls. None have been entirely effective. In general, these seawalls have proven to be unstable and eventually subject to collapse from the multitude of forces subjected to the wall.

SUMMARY OF THE INVENTION

According to the present invention, these and other problems in the prior art are solved by provision of an erosion control system comprising a multifaceted seawall positioned between a bluff and a body of water, and a drainage system positioned behind the seawall, within the bluff itself. The erosion control system stabilizes the bluff by preventing the erosion of the base of the bluff and by relieving the hydrostatic pressures within the bluff itself.

According to one aspect of the invention, a seawall is provided which has, on its seaward side, a deflector surface for deflecting waves upwardly, away from the seawall base, and a kicker surface for deflecting the upwardly surging water outwardly toward and over the body of water, away from the bluff. This seaward side minimizes the erosion of the seawall base, the washing of water over the seawall top, and harmlessly deflects most of the energy of the wave upwardly where it is dissipated. The landward side of the wall is provided with an anchor surface extending upwardly and inwardly from the base, and a cap or locking surface extending upwardly and outwardly from the anchor surface. When the seawall is in place, it is backfilled with sand or soil, the weight and pressure of which acts on the anchor and cap surfaces to lock the seawall into place.

According to another aspect of the invention, a drainage field is installed beneath the upper surface of the bluff and is connected to a plurality of drainage pipes extending through the seawall itself. This drainage system removes ground water from the bluff, water that washes over the top of the seawall, and precipitation that falls on the bluff itself. As such, the hydrostatic forces in the bluff are decreased, thus lowering the risk of landslides, the occurrence of which could endanger homes built on the top of the bluff.

According to another aspect of the invention, a method for constructing the above-described erosion control system is provided which involves excavation of the site and formation of the seawall with a continuous casting technique. The seawall is heavily reinforced so that it is capable of withstanding the multitude of forces encountered by such walls. Once the seawall is in place, the drainage field is installed and the landward side is partially backfilled with sand or soil.

The erosioh control system effectively stabilizes a bluff by protecting the base of the bluff from the erosive action of waves and by reducing the hydrostatic forces within the bluff itself. The seawall component of the system is protected from hydrostatic forces by the drain field and its construction and shape.

These and other modifications to the preferred embodiment of the present invention will best be understood with reference to the following description thereof, together with reference to the accompanying drawings.

BRIEF DESCRIPTION OF THE DRAWINGS

FIG. 4 is a perspective view of the mold used to construct the seawall of the present invention;

FIG. 5 is a perspective view showing the construction of the seawall; and

FIG. 6 is a cross-sectional view of an alternative embodiment of the seawall of the present invention.

DETAILED DESCRIPTION OF THE PREFERRED EMBODIMENTS

Figure 1:
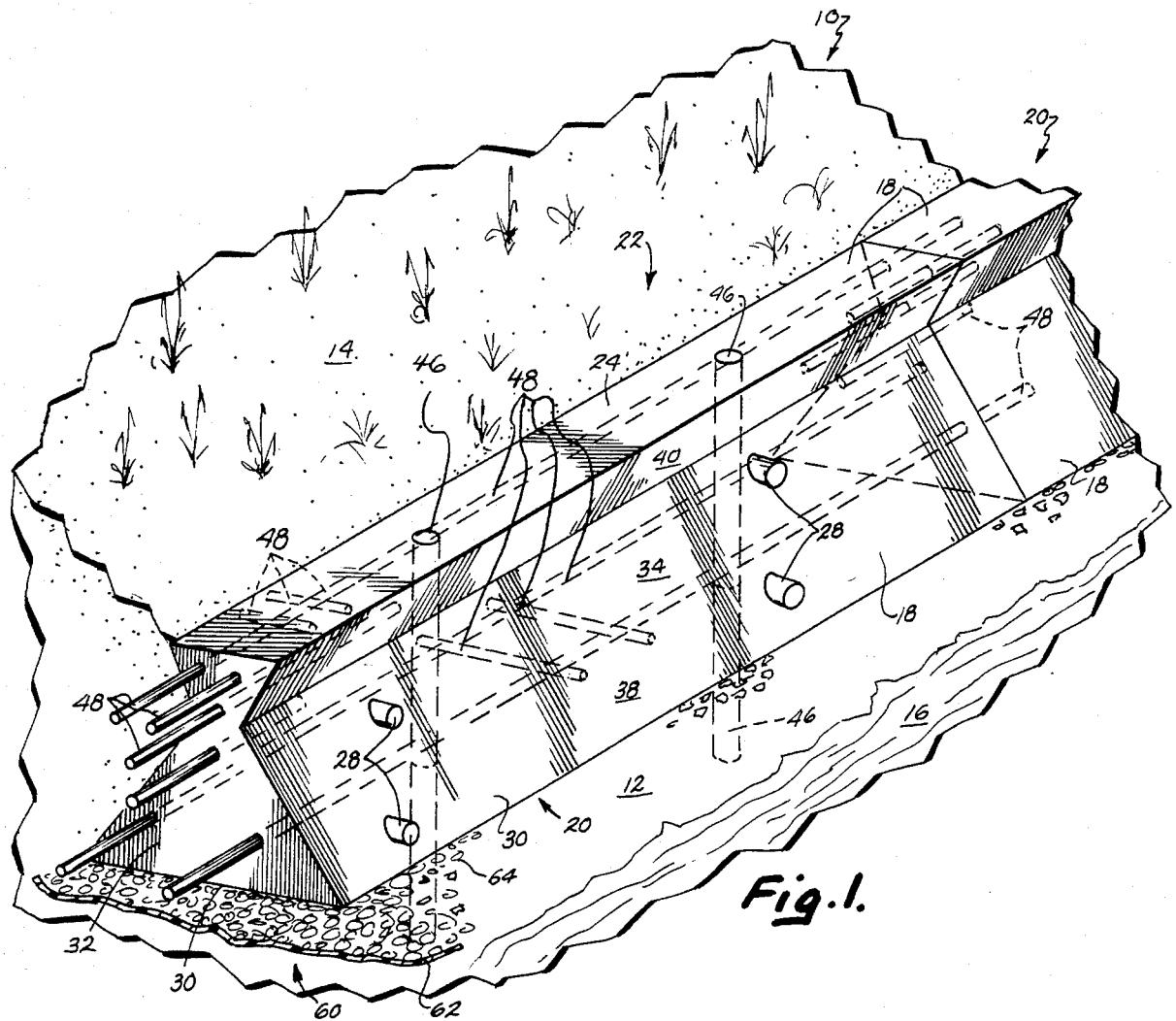
FIG. 1 is a perspective view of the seawall component of the erosion control system of the present invention.
Figure 2:
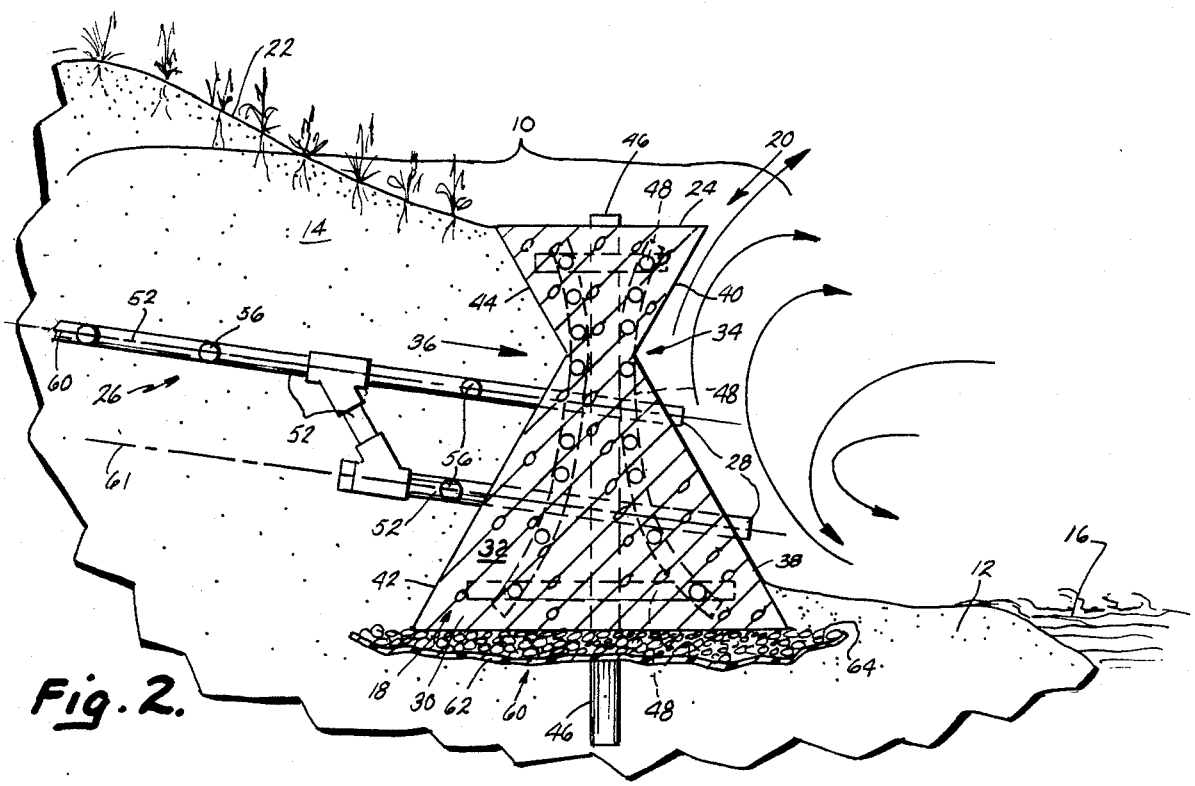
FIG. 2 is a cross-sectional view of the seawall and the drainage system of the present invention.

Referring to FIGS. 1 and 2, reference numeral 10 generally designates the erosion control system of the present invention which is adapted to be positioned on a beach 12, between a bluff 14 and a body of water 16. The erosion control system 10 comprises a seawall 20 having a number of integrally formed sections 18 cast on-site, end-to-end, to form a continuous seawall of any predetermined length. The bluff 14 is backfilled behind seawall 20 such that upper surface 22 of the bluff is substantially flush with top 24 of each seawall section 18. Erosion control system 10 further includes a drain field, generally designated by the numeral 26, best illustrated in FIG. 3, which is located beneath upper surface 22 of bluff 14. The drain field 26 is in communication with body of water 16 via a number of drain pipes 28 which extend through seawall 20.

More specifically, each section 18 of seawall 20 has an elongated, rectangular base portion 30 of substantial width, and an elongated, rectangular top portion 24 of more narrow width. Base portion 30 and top portion 24 are connected together by end walls 32. Extending between end walls 32 is a seaward sidewall or front wall 34 and a landward sidewall or back wall 36.

As best illustrated in FIG. 2, the front wall 34 is notched or generally concave so as to avoid the problems associated with flat seawalls. The concave front wall 34 is formed by a deflector surface 38 which slopes upwardly and inwardly from the seaward side of base portion 30, and by a kicker surface 40 sloping upwardly and outwardly from the deflector surface to the seaward side of top portion 24. Most of the energy of a wave striking the seaward sidewall 34 is directed upwardly along the deflector surface rather than downwardly toward the base of the seawall. As such, less scouring and tunneling occurs along the base of the seawall.

The water surging upwardly along the deflector surface then strikes kicker surface 40 which deflects that water into the air, back toward the body of water 16, away from bluff 14. Little, if any, water is washed over top 24 of the seawall and onto the bluff. As a result, the erosion of the seawall base by water percolating behind the seawall and running out beneath base portion 30 is minimized. Further, deflection of the water upwardly largely dissipates the energy of the wave in the air rather than reflecting it back into the body of water. This prevents the erosion of the beach just offshore from the seawall, a phenomenon observed with prior art seawall structures. In fact, the seawall structure of the present invention has been found to actually promote beach growth.

The back wall 36 of each seawall section 18 is also notched or generally concave. The concave back wall 36 comprises an anchor surface 42 which slopes upwardly and inwardly from the landward side of base portion 30 toward the seaward sidewall 34, and a cap surface 44 which slopes upwardly and outwardly from the anchor surface 42 toward the landward side of top portion 24. When the bluff is backfilled behind the seawall, the weight and pressure of the backfill on the anchor and cap surfaces, tend to lock the seawall into place. This counteracts the tendency of the seawall to topple as a result of the outwardly directed hydrostatic forces within the bluff acting on that landward sidewall, or as a result of waves striking the seaward sidewall 34. The provision of cap surface 44 is considered to be particularly important to lock the structure on the bluff. This feature is also thought to be particularly important in applications where there is much hydrostatic pressure within the bluff and heaving of the soil behind the seawall due to freezing. In general, the generally hourglass or pear-shaped cross section of the seawall with its broad base and narrow top are thought to promote the stability of the seawall by providing a low center of gravity.

With reference briefly to FIG. 6, although the deflector surface 38, the kicker surface 40, the anchor surface 42, and the cap surface 44 are illustrated herein as planar surfaces with a sharp transition therebetween, it should be understood that the surfaces may appear continuous. More particularly, the outwardly and inwardly facing sides 34 and 36, respectively, of the seawall sections 18 may be generally concave, circular or elliptically-shaped with a large arcuate transition between the upper deflector and cap surfaces 40 and 44 and the lower deflector and anchor surfaces 38 and 42, respectively.

With reference again to FIGS. 1 and 2, the seawall sections 18 are further anchored to the beach by a number of anchor posts 46 which extend vertically through the entire body of section 18 and into the soil below base portion 30. The posts are preferably made of steel.

Also with reference to FIGS. 1 and 2, seawall sections 18 are preferably constructed from reinforced concrete. The concrete is reinforced by a number of rods 48 which are embedded within the body of the seawall. Reinforcing rods are continuously laid in the traveling mold which is used to continuously cast each section 18 of the seawall 10. The rod 48 is laid within the seawall in both the longitudinal and transverse directions, and as best illustrated in FIG. 2, vertical segments may also be provided. The lengths of reinforcing rod are welded together prior to pouring of the concrete. It should be understood that only a small percentage of the reinforcing rod 48 is illustrated herein. The rods 48 that are illustrated are considered exemplary. This construction yields an extremely strong seawall which is capable of withstanding repeated pounding by large, powerful waves. The method of constructing seawall 20 is discussed below.

With specific reference to FIG. 2, in some cases, when the underlying soil is permeable or sandy, the base 30 of each seawall section 18 is positioned upon a bed 60 comprised of a geotextile material liner 62 filled with a layer of gravel 64. Bed 60 permits water from behind and beneath the seawall to flow out from under the seawall, thus preventing the sand beneath the seawall from tunneling or becoming soft. As a result, the seawall will not sink down into the sand upon which it is positioned. When the underlying strata is substantially water impermeable (i.e., clay), the geotextile liner and gravel may not be preferred.

Figure 3:
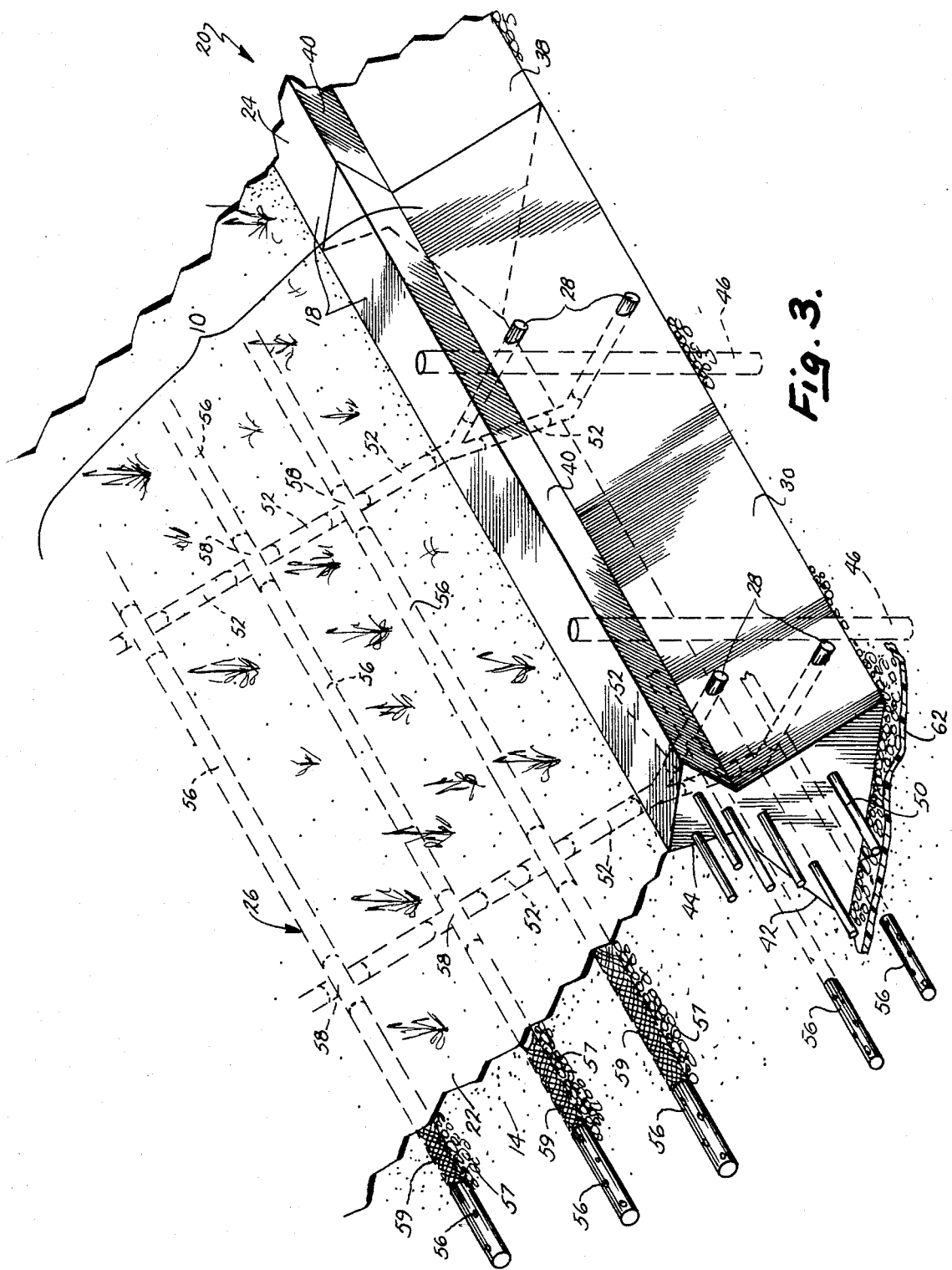
FIG. 3 is a perspective view, partially in section, showing the drainage system of the present invention and its connection with the seawall.

With reference now also to FIG. 3, each of the sections 18 is provided with a plurality of drain pipes 28 extending therethrough, from the landward sidewall to the seaward sidewall. The landward end of the pipe is positioned higher than the seaward end to facilitate the flow of water therethrough. Drain pipe 28 drains ground water from the bluff adjacent the seawall any water that may wash over the top of the seawall. These drain pipes, in combination with the kicker surfce, substantially decrease the hydrostatic pressure immediately adjacent the landward sidewall. This in turn stabilizes the seawall by minimizing the undermining of seawall base 30 caused by such percolating water as it flows underneath base portion 30 back toward body of water 16.

Preferably, each sewall section 18 has upper and lower drain pipes 28, an upper pipe located near top portion 24 to drain water from the bluff below surface 22 and a lower pipe located near base portion 40 to drain water from the base of the bluff.

With reference to FIGS. 2 and 3, erosion control system 10 further includes a drain field 26 which is positioned beneath the upper surface 22 of bluff 14. The drain field is connected to drain pipes 28, the drain field thereby removing water from the bluff and depositing it on the beach in front of the seawall. Drain field 26 is comprised of a number of conduits 52 which extend upwardly from their attachment to the landward end of upper drain pipe 28 toward the top of the bluff. Perforated drain tiles 56 extend between upwardly extending conduits 52, transverse to the slope of bluff 14. The tiles are in fluid communication with conduits 52 through coupling joints 58. These transversely extending drainage tiles are positioned on beds of gravel 57 and are wrapped in a layer of filter cloth 59 so as to prevent clogging of the perforations therein. The number of drain pipes, conduits and drainage tiles illustrated herein is considered exemplary. It should be understood that the specific number of elements used will be dependent on the topology of the site. However, it is considered important that the drain tiles be disposed on upper and lower levels 60 and 61, respectively, adjacent the back wall 36 of the seawall. It is also important that at least the upper level drain tiles extend some substantial distance up the slope 14. The upper drainage tiles primarily drain ground water, precipitation and overspray from the upper portions of the bluff. These drains substantially decrease the hydrostatic forces in the bluff which tend to cause landslides and/or which tend to topple the seawall. The lower drain tiles intercept water and decrease hydrostatic pressure at the base of the seawall thus preventing tunneling and/or build-ups of hydrostatic pressure at the base of the seawall which tend to apply a turning movement on the wall.

In operation, the seawall 20 and the drain field 26 of erosion control system 10 of the present invention act in concert to stabilize a bluff. The seawall stabilizes the bluff by preventing waves from eroding away the base of that bluff and by supporting the weight of the upper portion of the bluff. The drain field decreases the hydrostatic pressures within the bluff by draining water therefrom. The tendency of the bluff to slide onto the beach is thus minimized, thereby protecting buildings located on land adjacent the top of the bluffs.

The seawall itself is very stable. Waves crashing upon the seawall are directed upwardly toward the kicker surface by the deflector surface, and outwardly into the air toward the body of water by the kicker surface, rather than downwardly toward the base of the seawall and upwardly over the top of the seawall. As such, the undermining of the seawall by the downwardly directed turbulence, and by the wash water percolating behind the seawall, is minimzed. The weight of the backfill on the anchor surface anchors the seawall into place while the cap surface prevents the upheaval of soil and further locks the seawall in place. The strength and low center of gravity of the seawall also contribute to its success. Further, the drain field decreases hydrostatic pressure, erosion and stratification tending to turn or undermine the wall.

With reference now to FIGS. 4 and 5, the erosion control system of the present invention is constructed and installed on-site using a continuous casting technique. First, a mold 70 is provided for forming each of the sections 18 of the seawall 20. The mold is comprised of first and second end wall panels 72, 74, respectively, connected together by a pair of V-shaped sidewall panels 76. First end wall or end cap 72 is removably mounted on the ends of the sidewalls, the removal of which yields an elongated, generally U-shaped structure or form, best illustrated in FIG. 4. Second end wall 74 has a number of apertures 78 extending therethrough. As will be discussed below, the ends 50 of reinforcing rods 48 extend therethrough to facilitate connection with the next section of the seawall. Mold 70 has no top or bottom panels.

Next, the bluff is excavated on the beach in front of and along the base of the bluff. In cases where the soil is sandy, the trench is then lined with a layer of geotextile material 62, best illustrated in FIGS. 1–3. A layer of gravel 64 is then placed within the trench, the depth of that layer preferably being less than the depth of the trench itself. The liner and gravel form bed 60 upon which the seawall is positioned.

The first end section of the seawall is constructed by positioning mold 70, with first end wall 72 attached thereto, upon bed 60 at one of the ends of the trench. The vertical anchor posts 46 are then inserted in the mold and driven into soil below the mold, although in some cases it may be preferable to set the posts first and then place the mold therearound. Reinforcing rod 48 is then positioned within the mold with the ends 50 of the longitudinal lengths of rod extending through the apertures in second end wall 74. The lengths of reinforcing rod, best illustrated in FIGS. 1 and 2, are welded or otherwise suitably fastened together at the intersection thereof. It is also desirable to weld or otherwise fasten the reinforcing rod to upstanding vertical steel posts 46. The drain pipes 28 are then inserted in apertures 90 disposed in V-shaped sidewalls 76. A suitable length of heavy metal pipe, or the like, is preferably temporarily set within the drain pipes 28 to help stabilize the drain pipes during the pour and prevent the weight and pressure of the concrete from collapsing the pipes. When this is complete, concrete is poured into mold 70 substantially filling the same.

After the first section has set, first end wall 72 of mold 70 is removed. The resulting U-shaped structure is then slid along the length of the section just formed until only a small portion of that section remains positioned within the open end of the mold. Additional posts 46 are inserted in the mold and driven into the ground,. Reinforcing rod is inserted in the mold, longitudinal lengths of the rod being suitably connected to the ends 50, best illustrated in FIG. 5, extending from the end of the section of the seawall just formed. The ends of the longitudinal lengths of reinforcing rod just inserted are similarly arranged to extend through apertures in second end wall 74 for connection to the next section 18 of the seawall. Additional reinforcing rods and drain pipes are then installed as described above and the concrete is poured to complete the next section of the seawall.

The above process is repeated until a seawall of the desired length is formed. This method of construction yields a seawall whose individual sections are securely coupled together, of high strength, and firmly anchored to the beach.

Drain field 26 is then installed behind the seawall and connected to the drain pipes 28. To construct drain field 26, the top layers of bluff 14 are first removed. Subsequently, conduits 52 are positioned on the exposed surface of the bluff, the lower ends thereof being connected to the landward end of drain pipes 28. Next, gravel beds are installed between the conduit pipes, the beds running longitudinally to the slope of the bluff, generally parallel to the seawall. Perforated drain tiles 56, surrounded by a layer of filter cloth, are embedded within the gravel beds and connected to conduits 52 by couplers 58. As discussed above, these drain tiles drain ground water, rain water and water washed over the top of the seawall from the bluff.

After the drain field has been installed, it is covered with sand. Further, the landward side of the seawall is backfilled so that the surface of the bluff is substantially flush with the top of the seawall. Preferably, grasses and other suitable plantings are provided to assist in stabilizing the dune.

The foregoing description is exemplary and that of the preferred embodiment only. Modifications to the invention will occur to those who make and use the invention. It is desired to include within the scope of the present invention all such modifications that come within the proper scope of the appended claims.

The embodiments of the invention in which an exclusive property or privilege is claimed are defined as follows:

1. A longitudinally extending seawall for preventing the erosion of bluffs and beaches, comprising:
a base portion on said seawall adapted to be positioned on a beach;
a top portion on said seawall;
a seaward side on said seawall adapted to face a body of water, said seaward side having a deflector surface which slopes upwardly and inwardly from said base portion to deflect incoming water upwardly, along said deflector surface, and a kicker surface which slopes upwardly and outwardly, from said deflector surface to said top portion to project said incoming water moving up said deflector surface outwardly and upwardly toward said body of water, whereby said deflector surface, by deflecting water upwardly, minimizes the amount and energy of water that is directed downwardly toward said base portion, thereby preventing trenching and scouring along said base portion which can undermine said seawall from the seaward side, and said kicker surface, by projecting water away from the beach or bluff, minimizes the amount of water that is washed over the top portion, thereby decreasing the amount of water percolating behind the seawall which can undermine the seawall from the landward side;
a landward side on said seawall adapted to abut a bluff, said landward side having an anchor surface which slopes upwardly and inwardly from said base portion, and a cap surface which slopes upwardly and outwardly from said anchor surface to said top portion, said anchor and cap surfaces defining a concavity which is adapted to abut a bluff, whereby the weight and pressure of said bluff within said concavity acts on said sloping anchor surface, to stabilize said seawall, and said cap surface, to lock said seawall in place and resist heaving of said bluff, thereby preventing said seawall from overturning due to the force of incoming water crashing against its seaward side or pressures developed against its landward side; and
a drain means for removing water from said bluff behind said seawall, whereby removing water from said bluff decreases the hydrostatic pressure within said bluff, and the forces associated therewith, thereby stabilizing said bluff and the seawall in abutment therewith, said drain means comprising a plurality of drain pipes projecting through said seawall; and a drain field connected to the landward ends of said drain pipes and embedded under the surface of said bluff, wherein said drain field collects water in said bluff and drains that collected water through said drain pipes out onto said seaward side of said seawall, said drain field comprising a plurality of spaced apart conduits extending upwardly from said seawall toward the top of said bluff, and a plurality of spaced apart perforated drain tubes extending longitudinally across said bluff, between said pipes, said perforated drain tubes communicating with each of said upwardly extending conduits to form a grid.

2. A seawall as recited in claim 1 wherein said deflector surface and said kicker surface, and said anchor surface and said cap surface, are generally curvilinear in shape and have an arcuate transition therebetween to define concavely shaped seaward and landward sidewalls.

3. A seawall as recited in claim 1 wherein said deflector surface and said kicker surface, and said anchor surface and said cap surface, are planar and intersect to define notched seaward and landward sidewalls.

4. A seawall as recited in claim 1 wherein said perforated drain tubes extend on a first level longitudinally below the surface of said bluff and on a second level longitudinally along the base of said seawall.

5. A seawall as recited in claim 1 wherein said perforated drain tubes are wrapped with a filter cloth to prevent said tubes from becoming clogged with particulate matter and said wrapped tubes are positioned in a bed of gravel.

6. A seawall as recited in claim 1 further comprising a plurality of anchor posts which extend through said seawall and into the soil below said base portion to anchor said seawall in place.

7. A seawall as recited in claim 1 wherein said base portion is wider than said top portion, the weight of said seawall thereby being centered near said base portion to increase the stability of said seawall.

8. A seawall as recited in claim 1 wherein said base portion is positioned upon a bed comprised of a trench lined with a geotextile material and filled with gravel.

9. A seawall as recited in claim 1 wherein said seawall is constructed from concrete and is reinforced by a plurality of reinforcing rods which extend through said concrete, along the longitudinal and transverse directions of said seawall.

10. A seawall as recited in claim 6 wherein said base portion is wider than said top portion, the weight of said seawall thereby being centered near said base portion to increase the stability of said seawall.

11. A seawall as recited in claim 6 wherein said seawall is constructed from concrete and is reinforced by a plurality of reinforcing rods which extend through said concrete at different elevations and along the longitudinal and transverse directions of said seawall.

12. An erosion control system, comprisng in combination:
- a longitudinally extending seawall comprising a plurality of reinforced interconnected concrete seawall sections sequentially cast together, in situ, in front of a bluff, between said bluff and a body of water, each seawall section comprised of:
- a base portion on said seawall;
- a top portion on said seawall;
- a seaward side on said seawall adapted to face a body of water, said seaward side having a deflector surface which slopes upwardly and inwardly from said base portion to deflect incoming water upwardly, along said deflector surface, and a kicker surface which slopes upwardly and outwardly, from said deflector surface to said top portion to project said incoming water moving up said deflector surface outwardly and upwardly toward said body of water, whereby said deflector surface, by deflecting water upwardly, minimizes the amount and energy of water that is directed downwardly toward said base portion, thereby preventing trenching and scouring along said base portion which can undermine said seawall from the seaward side, and said kicker surface, by projecting water away from the beach or bluff, minimizes the amount of water that is washed over the top portion, thereby decreasing the amount of water percolating behind the seawall which can undermine the seawall from the landward side;
- a landward side on said seawall adapted to abut a bluff, said landward side having an anchor surface which slopes upwardly and inwardly from said base portion, and a cap surface which slopes upwardly and outwardly from said anchor surface to said tip portion, said anchor and cap surfaces defining a concavity which is adapted to abut a bluff, whereby the weight and pressure of said bluff within said concavity acts on said sloping anchor surface, to stabilize said seawall, and said cap surface, to lock said seawall in place and resist heaving of said bluff, thereby preventing said seawall from overturning due to the force of incoming water crashing against its seaward side or pressures developed against its landward side; and
- drain means for removing water from said bluff behind said seawall, wherein removing water from said bluff decreases the hydrostatic pressure within said bluff, and the pressures associated therewith, thereby stabilizing said bluff and the seawall in abutment therewith; said drain means comprising a plurality of drain pipes extending transversely through each section of said seawall and a drain field embedded under the surface of said bluff to collect water percolating therethrough, said drain field being connected with said drain pipes to provide for the flow of water collected by said drain field out of said bluff and onto the beach on said seaward side of said seawall, said drain field comprising a plurality of spaced apart conduits extending upwardly from said seawall toward the top of said bluff; and a plurality of spaced apart, perforated drain tubes extending between said upwardly extending pipes and being in communication therewith to form an interconnected grid.

13. An erosion control system as recited in claim 12 wherein said deflector surface and said kicker surface, and said anchor surface and said cap surface, are generally curvilinear in shape and have an arcuate transition therebetween to define concavely shaped seaward and landward sidewalls.

14. An erosion control system as recited in claim 12 wherein said deflector surface and said kicker surface, and said anchor surface and said cap surface, are planar and intersect to define notched seaward and landward sidewalls.

15. An erosion control system as recited in claim 12, wherein said perforated drain tubes extend longitudinally along said seawall on a first level below the surface of said bluff and on a second level longitudinally along the base of said seawall.

16. An erosion control system as recited in claim 12 wherein said perforated drain tubes are wrapped with a filter cloth, wrapping to prevent said tubes from becoming clogged with particulate matter and said wrapped tubes are positioned in a bed of gravel.

17. An erosion control system as recited in claim 12 further including a plurality of anchor posts extending through each of the sections of said seawall and into the soil below said base portions thereof, to anchor each of said sections into place.

18. An erosion control system as recited in claim 12 wherein said base portion of each section is wider than said top portion, the center of gravity of each section thereby being located near said base portion to increase the stability of said section.

19. An erosion control system as recited in claim 12 wherein said base portion is positioned on a bed comprised of a gravel-filled trench lined with a layer of geotextile material.

20. An erosion control system as recited in claim 12 wherein said seawall is reinforced by a plurality of reinforcing rods which extend through the concrete at different elevations and along the longitudinal and transverse directions of said seawall, said longitudinal reinforcing rods extending between adjacent sections of said seawall.

21. A method for constructing an erosion control system, comprising the steps of:
(1) providing a mold comprising a generally U-shaped form having an end piece and two elongate sides, and a removable end cap for closing the open end of said U-shaped form, said end piece being provided with apertures extending therethrough;
(2) positioning said mold, with said end cap connected to the open end of said U-shaped form, between a bluff and a body of water;
(3) mounting longitudinal lengths of reinforcing rod in said mold, the ends of which extend through said apertures for connection with reinforcing rod in an adjacent section of said sidewall;
(4) filling said mold with concrete to form a first section of a seawall;
(5) removing said end cap from said U-shaped form after said first section of said seawall has set;
(6) repositioning said U-shaped form by sliding said form along the first section of said seawall until only the end of said first section remains between said open end of said U-shaped form;
(7) pouring concrete in said mold to form a second section of a seawall; and (8) after said second section has set, repeating the steps until a seawall of the desired length is formed.

22. A method for constructing an erosion control system as defined in claim 21 wherein the step of positioning said mold further comprises:
   (1) digging a trench of a length at least coextensive with the length of the final seawall;
   (2) lining said trench with a geotextile materal;
   (3) filling said trench with gravel; and
   (4) Placing said mold atop said gravel-filled trench.

23. A method for constructing an erosion control system as defined in claim 21, further comprising the step of anchoring said seawall onto said beach by driving a plurality of anchor posts through said mold and into said beach prior to said pouring step.

24. A method for constructing an erosion control system as recited in claim 21 further comprising the step of backfilling said seawall such that the upper surface of said backfill is substantially flush with the top of said seawall.

25. A method for constructing an erosion control system as defined in claim 21 further comprising the steps of:
   excavating said bluff and installing a drainfield thereunder;
   installing a plurality of drain pipes extending through said mold prior to said pouring step; and
   connecting said drainfield to said drain pipes.

26. A method for constructing an erosion control system as defined in claim 25 wherein the step of excavating said bluff and installing said drainfield further includes the steps of establishing elongate runs of drain tile extending below the surface of said bluff and longitudinally along the base of the seawall.

27. A method for constructing an erosion control system as defined in claim 26 further including the steps of wrapping said drain tile with filter cloth and embedding the same in gravel.

* * * * *